US010742864B2

(12) United States Patent
Khazanov et al.

(10) Patent No.: US 10,742,864 B2
(45) Date of Patent: Aug. 11, 2020

(54) CONTROLLING CAMERAS IN SPORTS EVENTS

(71) Applicant: PLAYSIGHT INTERACTIVE LTD., Kfar Saba (IL)

(72) Inventors: Evgeni Khazanov, Petah Tiqva (IL); Chen Shachar, Kohav Yair (IL)

(73) Assignee: PLAYSIGHT INTERACTIVE LTD., Kfar Saba (IL)

( * ) Notice: Subject to any disclaimer, the term of this patent is extended or adjusted under 35 U.S.C. 154(b) by 122 days.

(21) Appl. No.: 15/039,204

(22) PCT Filed: Sep. 13, 2014

(86) PCT No.: PCT/IB2014/064487
§ 371 (c)(1),
(2) Date: May 25, 2016

(87) PCT Pub. No.: WO2015/087172
PCT Pub. Date: Jun. 18, 2015

(65) Prior Publication Data
US 2017/0161913 A1 Jun. 8, 2017

Related U.S. Application Data

(60) Provisional application No. 61/913,457, filed on Dec. 9, 2013.

(51) Int. Cl.
*H04N 5/232* (2006.01)
*H04N 5/247* (2006.01)
(Continued)

(52) U.S. Cl.
CPC ......... *H04N 5/23203* (2013.01); *G06T 7/292* (2017.01); *H04N 5/23245* (2013.01);
(Continued)

(58) Field of Classification Search
None
See application file for complete search history.

(56) References Cited

U.S. PATENT DOCUMENTS 6,567,116 B1 * 5/2003 Aman ................. G06K 9/3216
348/169
2004/0136689 A1 7/2004 Oka
(Continued)

OTHER PUBLICATIONS

International Search Report issued in PCT/IB2014/064487, dated Jan. 6, 2016 (1 page).
(Continued)

*Primary Examiner* — Lindsay J Uhl
(74) *Attorney, Agent, or Firm* — Acuity Law Group, PC; Michael A. Whittaker

(57) ABSTRACT

A method for controlling cameras in a sport event, the method comprising steps executed by at least one computer, the steps comprising: during a sport event taking place in a constrained environment, receiving images of the sport event, the images being captured with a first pixels to time ratio, tracking a motion of a first object, using the images being captured with the first pixels to time ratio, detecting an arrival of the first object into a predefined positional relation to a second object during the tracked motion, and upon the detected arrival, initiating streaming of images being captured with a pixels to time ratio higher than the first pixels to time ratio by at least one selected camera.

25 Claims, 9 Drawing Sheets

(51) Int. Cl.
　　　*G06T 7/292*　　　(2017.01)
　　　*H04N 5/235*　　　(2006.01)
(52) U.S. Cl.
　　　CPC ... *H04N 5/247* (2013.01); *G06T 2207/30241* (2013.01); *H04N 5/2353* (2013.01)

(56) References Cited

U.S. PATENT DOCUMENTS

| | | | |
|---|---|---|---|
| 2006/0056056 A1 | 3/2006 | Ahiska et al. | |
| 2008/0055413 A1 | 3/2008 | Hayashi | |
| 2008/0129825 A1* | 6/2008 | DeAngelis | A63B 24/0021 348/169 |
| 2009/0122162 A1* | 5/2009 | Shabtay | G02B 15/14 348/240.1 |
| 2010/0026809 A1* | 2/2010 | Curry | H04N 5/222 348/157 |
| 2010/0165151 A1* | 7/2010 | Chitnis | H04N 1/2112 348/240.2 |
| 2011/0205022 A1* | 8/2011 | Cavallaro | A63B 24/0021 340/8.1 |
| 2012/0082347 A1 | 4/2012 | Kim et al. | |
| 2012/0182435 A1* | 7/2012 | Silberstein | H04N 1/0035 348/208.4 |
| 2013/0201344 A1* | 8/2013 | Sweet, III | G06K 9/00261 348/169 |

OTHER PUBLICATIONS

International Written Opinion issued in PCT/IB2014/064487 dated Jan. 6, 2016 (7 pages).

* cited by examiner

CONTROLLING CAMERAS IN SPORTS EVENTS

CROSS-REFERENCE TO RELATED APPLICATIONS

The present invention is filed under 35 U.S.C. § 371 as the United States national phase of International Application No. PCT/IB2014/064487, filed Sep. 13, 2014, which designated the United States and which claims the benefit of priority to U.S. Provisional Application No. 61/913,457, filed Dec. 9, 2013, each of which is hereby incorporated in its entirety including all tables, figures, and claims.

FIELD AND BACKGROUND OF THE INVENTION

The present invention relates to controlling cameras and, more particularly, but not exclusively to controlling cameras in sport events.

Numerous popular sport events such as soccer, basketball, cricket, tennis or baseball, are played globally. When played, many of the games are broadcasted, to be shown as live telecasts to spectators, on TV channels, web sites, etc.

Usually, videos of most of the sports events are generated in a substantially manual manner, and require many people to be employed, say cameramen that continuously capture motion pictures of different regions of a court area, as well as of corresponding activities of different players involved in the sports events.

For example, during video filming of a soccer match played on a soccer field, different cameramen may be active in different regions around the field, and continuously capture video images of players running, kicking a ball, etc., during the soccer match. Usually, the cameramen are placed, supervised, and directed by television directors, as known in the art.

Some cameramen may be dedicated to following a ball continuously, as the match progresses.

Specifically and additionally, there may also be a cameraman who is dedicated to identifying and capturing most interesting events during the match—such as a goal, an in/out event, etc., which events are usually of interest to spectators, as well as to officials such as line judges and side judges.

The cameraman who is dedicated to identifying and capturing the most interesting events, may use a camera of higher qualities, say a wider zooming range, a camera with better lenses, etc. However, the quality and timing of capturing of the interesting events depends on the skills, experience, sense of timing, etc., of the dedicated cameraman and/or a director supervising the cameraman, during the sport event's filming.

Thus, the broadcasting of sport events in general, and the identification of events of interest (goals, in/outs, etc.) during sport events, in particular, remain processes that depend on substantially manual management and control of cameras and cameramen.

SUMMARY OF THE INVENTION

According to one aspect of the present invention, there is provided a method for controlling cameras in a sport event, the method comprising steps executed by at least one computer, the steps comprising: during a sport event taking place in a constrained environment, receiving images of the sport event, the images being captured with a first pixels to time ratio, tracking a motion of a first object, using the images being captured with the first pixels to time ratio, detecting an arrival of the first object into a predefined positional relation to a second object during the tracked motion, and upon the detected arrival, initiating streaming of images being captured with a pixels to time ratio higher than the first pixels to time ratio by at least one selected camera.

According to a second aspect of the present invention, there is provided an apparatus for controlling cameras in a sport event, the apparatus comprising: a computer, an image receiver, implemented on the computer, and configured to receive images of a sport event taking place in a constrained environment, during the sport event, the images being captured with a first pixels to time ratio, a motion tracker, in communication with the image receiver, configured to track a motion of a first object, using the images being captured with the first pixels to time ratio, a positional relation detector, in communication with the motion tracker, configured to detect an arrival of the first object into a predefined positional relation to a second object during the tracked motion, and a camera controller, in communication with the positional relation detector, configured to initiate streaming of images being captured with a pixels to time ratio higher than the first pixels to time ratio by at least one selected camera, upon the detected arrival.

According to a third aspect of the present invention, there is provided a non-transitory computer readable medium storing computer executable instructions for performing steps of controlling cameras in a sport event, the steps comprising: during a sport event taking place in a constrained environment, receiving images of the sport event, the images being captured with a first pixels to time ratio, tracking a motion of a first object, using the images being captured with the first pixels to time ratio, detecting an arrival of the first object into a predefined positional relation to a second object during the tracked motion, and upon the detected arrival, initiating streaming of images being captured with a pixels to time ratio higher than the first pixels to time ratio by at least one selected camera.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system.

In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
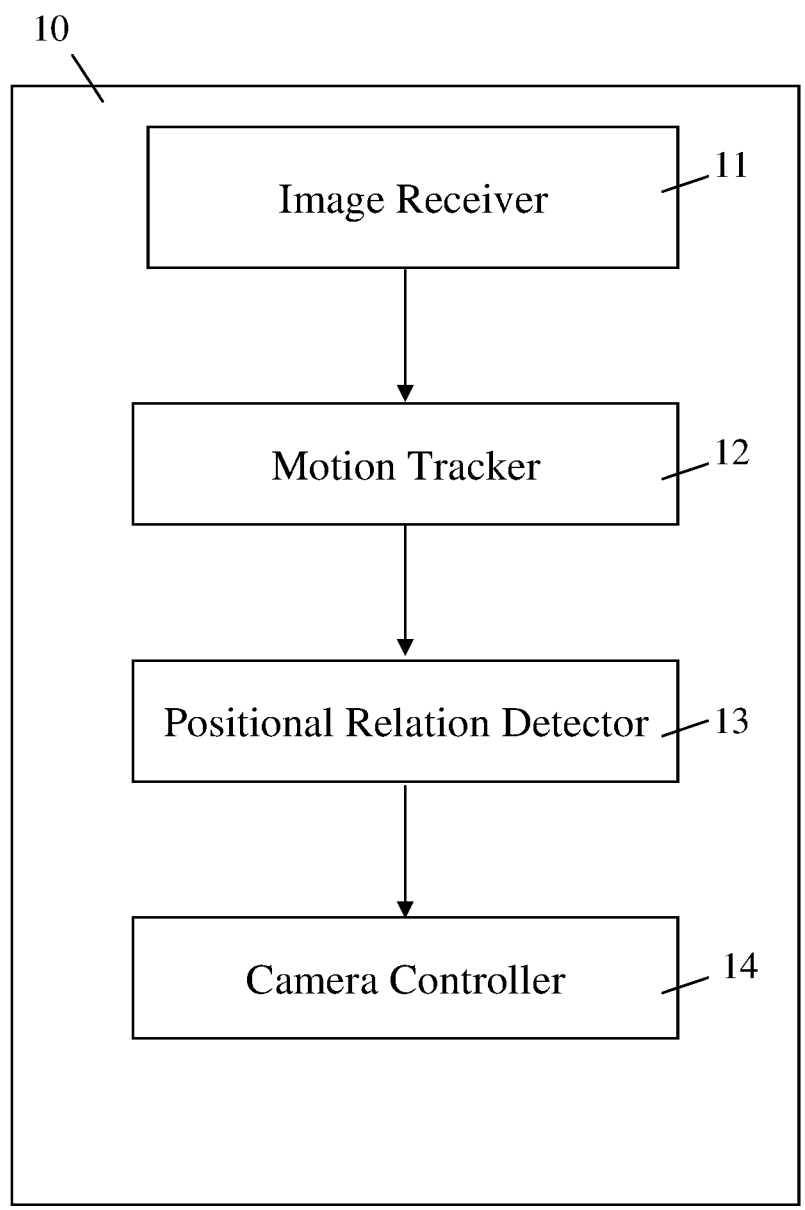
FIG. 1 is a block diagram schematically illustrating an exemplary apparatus, for controlling cameras in a sport event, according to an exemplary embodiment of the present invention.

The present embodiments comprise an apparatus and a method for controlling cameras in a sport event.

Every day, numerous popular sport events such as soccer matches, basketball games, cricket games, tennis matches or baseball games, are played globally. When played, many of those sport events are broadcasted, to be shown as live telecasts to spectators, on TV channels, web sites, etc.

Usually, videos of most of the sports events are generated in a substantially manual manner, which requires many people to be employed, for example cameramen that continuously capture motion pictures of different regions of a court area, and of corresponding activities of different players involved in the sports events. Further employed are cameramen dedicated to identifying and capturing most interesting events during the match—such as a goal, an in/out event, etc., which events are usually of interest to spectators, as well as to officials such as line judges.

According to some embodiment of the present invention, during a sport event taking place in a constrained environment (say a tennis court or a football field), there are received images of the sport event, in real time, as the images are being captured with a first pixels to time ratio. The received images captured with the first pixels to time ratio, are used to track a first object's motion (say a tennis ball's or a soccer player's motion.

Upon automatic detection of an arrival of the first object (say the tennis ball) into a predefined positional relation to a second object (say to a volleyball net, to a soccer gate, or to a boundary line on a tennis court), there is automatically initiated a streaming of images being captured with a pixels to time ratio higher than the first pixels to time ratio—say in a higher image capture frequency, in a higher image resolution, or with both the image capture frequency and the image resolution being higher, by one or more camera(s).

In one example, a tennis ball's motion, away from a player who serves the ball to an opponent, is tracked using images captured by cameras positioned over corners of a tennis court with a first pixels to time ratio (say in a first image capture frequency and resolution), as described in further detail hereinbelow.

Optionally, the motion is tracked through a stereoscopic or other analysis of the images captured with the first pixels to time ratio, which analysis yields a three dimensional (3D) space which represents the constrained environment, as described in further detail hereinbelow.

In the example, when the ball's distance from a net positioned in the middle of the court closes into below a predefined threshold, during the ball's tracked motion away from the player, there is initiated a streaming of images being captured with a pixels to time ratio higher than the first pixels to time ratio.

The images are captured with the higher pixels to time ratio by one or more selected cameras, say by cameras of a higher capture frequency, a higher resolution, or by cameras of both a higher resolution and a higher image capture frequency, which cameras are positioned at two ends of the net, as described in further detail hereinbelow.

Thus, according to some embodiments, an event of interest (say an out event, a net event, etc.) may be captured in the images captured with the higher pixels to time ratio, which images are automatically streamed upon the detection of the arrival of the first object into the predefined positional relation, during the tracked motion of the first object.

With the initiation of the streaming being automatically (rather than manually) initiated upon the automatic detection of the first object's arrival into the predefined positional relation to the second object, the event of interest (say a goal or an out event) is much less likely to be missed. Further, the event of interest is much less likely to be captured with a lower, and thus less informative, pixels to time ratio.

Thus, in a first example, during a tennis match, a ball's motion may be tracked, through an analysis of images captured in a resolution of 2048×1080 pixels, say using 2K digital cameras.

When the ball arrives at a predefined positional relation to a borderline, say into a distance of less than two meters from the borderline, there is automatically initiated a streaming of images captured in a resolution of 15360×8640 pixels, say by one or more selected 16K digital camera(s) positioned next to the borderline.

Consequently, a position of the ball may be more accurately determined, as described in further detail hereinbelow.

In a second example, during a tennis match, a ball's motion may be tracked, through an analysis of images captured during the match, in a 50 Hz image capture frequency—i.e. with an accuracy of 20 milliseconds.

When the ball arrives at a predefined positional relation to a borderline, say into a distance of less than two meters from the borderline, there is automatically initiated a streaming of images captured in a 1000 Hz image capture frequency—i.e. with an accuracy of one millisecond—by one or more selected cameras.

Optionally, the selected camera is a camera closest to a segment of the borderline which the ball's trajectory seems to lead to, as described in further detail hereinbelow.

Consequently, there is enabled, a capturing of the image of the ball at the exact millisecond of the ball's landing, which capturing is much likely to occur with the capture rate of 50 Hz, having the accuracy of 20 milliseconds only.

The improved accuracy resultant upon the higher pixels to time ratio, may allow a broadcaster, to provide spectators of a sport event, say on a TV channel or web site, with a close up video which clearly shows the event of interest, say the out event as captured in the higher pixels to time ratio. Further, the close up video is likely to remove doubts as to a decision, say of a line judge.

The improved accuracy which is resultant upon the higher pixels to time ratio, may also make the tracking of the ball's motion during the event of interest more accurate, and provide for more accurate characterization the event, as described in further detail hereinbelow.

Thus, according to an exemplary embodiment, during the tennis match, interesting events, such as an out event, are captured with the higher pixels to time ratio—which pixels to time ratio provides for greater accuracy, but involves the processing of a greater number of pixels per minute (i.e. of a higher volume of data), and is thus likely to be heavier in terms of bandwidth consumed by the streamed images, data storage, etc.

However, the images of the remaining parts of the sport event are captured and received in the lower pixels to time ratio—which is less accurate, but lighter in terms of bandwidth consumption, data storage, etc.

Consequently, there may be provided a potentially optimal usage of the cameras of different pixels to time ratios (i.e. cameras which differ in image capture frequency, image capture resolution, or in both image capture frequency and image capture resolution, as described in further detail hereinabove.

The principles and operation of a method and an apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating an exemplary apparatus, for controlling cameras in a sport event, according to an exemplary embodiment of the present invention.

An apparatus 10 for controlling cameras in a sport event, according to an exemplary embodiment of the present invention, includes a computer. The computer may be a single computer or a group of computers in communication over a network.

The apparatus 10 further includes one or more additional parts 11-14. The parts 11-14 may be implemented as software, as hardware, or as a combination of hardware and software, on the computer, as described in further detail hereinbelow.

The apparatus 10 communicates with one or more cameras, for receiving images, for initiating a streaming of images, etc., as described in further detail hereinbelow.

In one example, the apparatus 10 communicates with cameras positioned around a constrained environment (say a football field or a tennis court) in which a sport event takes place, and with cameras positioned over specific parts of the constrained environment.

The apparatus 10 may control one of more of the cameras, for receiving images captured with a first pixels to time ratio—say in a first frequency and resolution, from one or more of the cameras, for receiving images captured in a higher pixels to time ratio, from the same or other camera(s), etc., as described in further detail hereinbelow.

The apparatus 10 includes an image receiver 11, implemented on the computer.

The image receiver 11 receives images of a sport event taking place in a constrained environment (say a football field, a soccer field, a tennis court, etc.), during the sport event.

The received images are captured with a first pixels to time ratio, say in a first image capture frequency and resolution, say by one or more of the cameras positioned around the constrained environment, as described in further detail hereinbelow.

The apparatus 10 further includes a motion tracker 12, in communication with the image receiver 11.

The motion tracker 12 tracks a motion of a first object (say a ball or a player), using the images which are captured in the first pixels to time ratio, during the sport event, in real time.

Optionally, the motion tracker 12 tracks the motion through a stereoscopic or other analysis of the images captured in the first pixels to time ratio, which analysis yields a three dimensional (3D) space which represents the constrained environment, and objects in motion over the constrained environment, as known in the art.

The apparatus 10 further includes a positional relation detector 13, in communication with the motion tracker 12.

The positional relation detector 13 detects an arrival of the first object (say the ball) into a predefined positional relation to a second object (say a borderline, a tennis net, a soccer gate, etc.), during the motion tracked by the motion tracker 12.

Optionally, the positional relation detector 13 bases the detecting of the arrival of the first object into the predefined positional relation to a second object, at least on a predefined change in shape of one of the objects (say a squeezing of the ball when the ball hits a racket or a wall, a change in shape of a tennis net when hit by the ball, etc.).

Optionally, the positional relation detector 13 bases the detection of the arrival of the first object into the predefined positional relation to a second object, at least on a distance between the objects.

In one example, the positional relation detector 13 detects an arrival of a ball at a distance of below a predefined threshold from a net positioned in the middle of a constrained environment such as a tennis court, or from a borderline, during the ball's motion away from a player who strikes the ball with a racket, as tracked by the motion tracker 12.

In another example, the positional relation detector 13 detects an arrival of a ball at a distance of above a predefined threshold from a player, during the ball's motion away from a player who kicks the ball, as tracked by the motion tracker 12.

In yet another example, the positional relation detector 13 detects an arrival of a player at a distance of below a predefined threshold from a football gate during the player's motion, as tracked by the motion tracker 12.

The apparatus 10 further includes a camera controller 14, in communication with the positional relation detector 13.

The camera controller 14 initiates a streaming of images being captured with a pixels to time ratio higher than the first pixels to time ratio, say in a higher frequency, in a higher resolution, or in both a higher frequency and a higher resolution, by one or more selected camera(s), upon the arrival detected by the positional relation detector 13.

Optionally, the apparatus 10 further includes a camera selector (not shown), in communication with the camera controller 14.

The camera selector selects the one or more camera(s) which capture(s) the images in the higher pixels to time ratio, among a set which consists of two or more cameras, based on a rule predefined by an operator, an administrator, a developer of the apparatus 10, etc.

Optionally, the camera selector selects the one or more camera(s), based on a trajectory of the tracked motion of the first object and on the field of view of the selected camera(s), as described in further detail hereinbelow.

Each of the cameras in the set has a different field of view, which may cover a respective, different part of the constrained environment, say an area around a net deployed on a volleyball court, a specific segment of a borderline of a tennis court, an area around a soccer gate, etc.

Optionally, the selected cameras include two or more cameras deployed at different sides of a same part of the constrained environment (say on the two ends of the net, or of a borderline segment), with a different (say opposite) field of view on the same part, as described in further detail hereinbelow.

Optionally, images captured by the two (or more) selected cameras deployed at different sides of a same part, are stereoscopically analyzed, to yield a three dimensional (3D) space which represents the part of the constrained environment covered by the selected cameras and objects in motion over that covered part, as described in further detail hereinbelow.

Optionally, upon the detection of the arrival of the first object into the predefined positional relation, the camera controller 14 further initiates a change in field of view of the selected camera(s), say by triggering an actuator.

Consequently, the actuator moves the selected camera, in a rotational motion or in a motion which involves a change of tilt, so as to capture a part of the constrained environment, approached by the first object.

In one example, the selected camera is a camera also used for capturing at least some of the images captured with the first pixels to time ratio and received by the image receiver 11, and the camera controller 14 changes the selected camera's pixels to time ratio to the higher pixels to time ratio, upon the detected arrival. That is to say that in the example, the same camera is used to capture images with both pixels to time ratios, as described in further detail hereinbelow.

Optionally, the camera controller 14 further stops the streaming of the images which are captured with the pixels to time ratio higher than the first pixels to time ratio, from the selected cameras, according to a predefined rule.

In one example, the camera controller 14 stops the streaming after a predefined number of seconds following the detected arrival into the positional relation, upon a subsequent detection of an end of the event (say a crossing of the ball into an area within a soccer gate, a few seconds after that crossing, etc.), as described in further detail hereinbelow.

Optionally, the apparatus 10 further includes an image combiner (not shown), in communication with the camera controller 14.

The image combiner combines at least a few of the images captured with the first pixels to time ratio and at least a few of the images captured with the higher pixels to time ratio, for creating an effect of zooming into a part of the constrained environment covered by a field of view of the selected camera(s).

The improved accuracy resultant upon the higher pixels to time ratio, may thus allow a broadcaster, to provide spectators of a sport event, say on a TV channel or a website, with a close up video which creates an effect of zooming into the part of the constrained environment covered by the field of view of the selected camera(s).

Consequently, there may be clearly shown the event of interest, say an out event captured in the higher pixels to time ratio, in the close up video. The video may thus potentially remove doubts as to proper officiating (say as to a decision made by an official such as a line judge during a football match or a tennis match).

In one example, the apparatus 10 further includes two or more low frequency (LF) cameras, i.e. cameras of a low image capture frequency (say of 25 Hz), positioned around the constrained environment, say four LF cameras positioned roughly at the four corners of a tennis or a soccer field. The LF cameras capture the images in the low frequency, during the sport event, and forward the captured images to image receiver 11, as described in further detail hereinabove, and as illustrated using FIG. 3A and FIG. 3B.

In the example, the apparatus 10 further includes several high frequency (HF) cameras, i.e. cameras of a high image capture frequency (say of 2,000 Hz), positioned at different parts of the constrained environment. Each the HF cameras has a different field of view, which covers a respective, different part of the constrained environment, say an area around a net, a specific segment of a borderline of a football field or a soccer field, etc., as described in further detail hereinbelow.

Upon the detection of the first object's arrival into the positional relation, as detected by the positional relation detector 13, using the images captured by the LF cameras in the low frequency, the images captured by the HF cameras in the high frequency, are streamed to the apparatus 10, in real time (or in near real time), as described in further detail hereinabove, and as illustrated using FIG. 3A and FIG. 3B.

Figure 2:
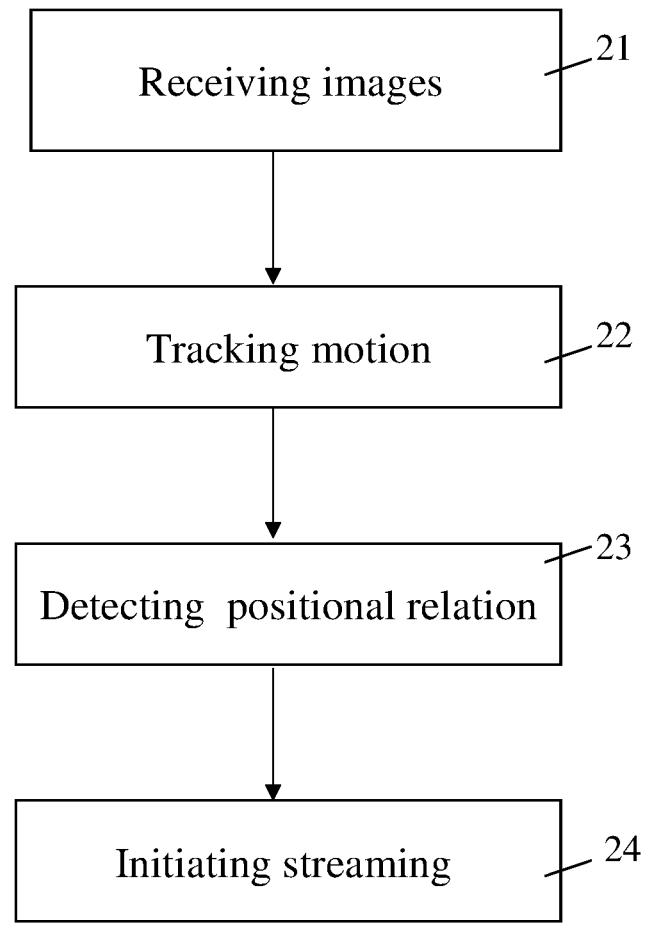
FIG. 2 is a flowchart schematically illustrating an exemplary method, for controlling cameras in a sport event, according to an exemplary embodiment of the present invention.

Reference is now made to FIG. 2, which is flowchart schematically illustrating an exemplary method, for controlling cameras in a sport event, according to an exemplary embodiment of the present invention.

A first exemplary method for controlling cameras in a sport event, according to an exemplary embodiment of the present invention, may be executed by a computer. The computer may be a single computer or a group of computers in communication over a network.

For carrying out the method, the computer communicates with one or more cameras, through the internet, an intranet network, or local area network, another network, or any combination thereof, for receiving images, initiating a streaming of images from one or more cameras, stopping a streaming of images from one or more cameras, etc., as described in further detail hereinbelow.

In one example, the cameras are positioned around a constrained environment (say a football field or a tennis court) in which a sport event takes place, and over specific parts of the constrained environment, as described in further detail hereinbelow.

In the method, there are received 21 images of a sport event taking place in a constrained environment (say a football field, a soccer field, a tennis court, etc.), during the sport event, say by the image receiver 11, as described in further detail hereinabove.

The received 21 images are captured with a first pixels to time ratio, say in a first image capture frequency and a first resolution, say by one or more of the cameras positioned around the constrained environment, as described in further detail hereinbelow.

During the receiving 21, there is tracked 22 a motion of a first object (say a ball or a player), using the received 21 images which are captured with the first pixels to time ratio, during the sport event, in real time (or in near real time), say by the motion tracker 12, as described in further detail hereinabove.

Optionally, the motion is tracked 22 through a stereoscopic or other analysis of the images captured with the first pixels to time ratio, which analysis yields a three dimensional (3D) space which represents the constrained environment and objects in movement over the constrained environment, as known in the art.

When the first object (say the ball) arrives into a predefined positional relation to a second object (say a tennis net, a soccer gate, etc.), during the tracked 22 motion, in real time (or near real time), the arrival of the first object into the positional relation to a second object is detected 23, say by the positional relation detector 13, as described in further detail hereinabove.

Optionally, the detection 23 is based at least on a predefined change in shape of one of the objects (say a squeezing of the ball when the ball hits a racket or a wall, or a change in shape of a tennis net hit by the ball).

Optionally, the detection 23 is based at least on a distance between the objects. In one example, there is detected 23 an arrival of a ball at a distance of below a predefined threshold from a net positioned in the middle of a constrained environment such as a tennis court, or from a borderline, during the ball's motion away from a player who strikes the ball with a racket, as tracked by the motion tracker 12.

In another example, there is detected 23 an arrival of a ball at a distance of above a predefined threshold from a player who kicks the ball, during the ball's motion away from the player, as tracked by the motion tracker 12.

In yet another example, there is detected 23 an arrival of a player at a distance of below a predefined threshold from a football gate, during the player's motion, as tracked by the motion tracker 12.

Upon the detection 23 of the arrival into the positional relation, there is automatically initiated 24 a streaming of images being captured in a pixels to time ratio higher than the first pixels to time ratio, say in a higher image capture frequency, in a higher image resolution, or in both a higher image capture frequency and a higher image resolution, by one or more selected camera(s).

Optionally, the one or more camera(s) are selected, say by the camera selector of apparatus 10, among a set which consists of two or more cameras, as described in further detail hereinabove.

Optionally, the selection is based on a rule predefined by an operator, an administrator, a developer of the apparatus 10, etc.

Optionally, the one or more camera(s) are selected based on a trajectory of the tracked 22 motion of the first object and on the field of view of the selected camera(s), as described in further detail hereinbelow.

Each of the cameras in the set has a different field of view, which may cover a respective, different part of the constrained environment, say an area around a net deployed on a volleyball court, a specific segment of a borderline of a tennis court, an area around a soccer gate, etc.

Optionally, the selected cameras include two or more cameras deployed at different sides of a same part of the constrained environment (say on the two ends of the net, or of a borderline segment), with a different (say opposite) field of view on the same part, as described in further detail hereinbelow.

Optionally, images captured by the two (or more) selected cameras deployed at different sides of a same part, are stereoscopically analyzed, to yield a three dimensional (3D) space which represents the part of the constrained environment covered by the selected cameras and objects in motion over that covered part, as described in further detail hereinbelow.

Optionally, there is further initiated a change in field of view of the selected camera(s), say by triggering an actuator, say by the camera controller 14, as described in further detail hereinabove.

Consequently, the actuator moves the selected camera, in a rotational motion or in a motion which involves a change of tilt, so as to capture a part of the constrained environment, approached by the first object.

In one example, the selected camera is a camera also used to capture at least some of the received 21 images captured with the first pixels to time ratio, and the selected camera's pixels to time ratio is changed to the higher pixels to time ratio (say to a mode with a higher image capture frequency, with a higher image capture resolution, or with both), upon the detected 23 arrival, say by the camera controller 14. That is to say that in the example, the same camera is used to capture images with both pixels to time ratios.

Optionally and subsequently, the streaming of the images captured with the pixels to time ratio higher than the first frequency pixels to time ratio, from the selected cameras, is stopped according to a predefined rule, say by the camera controller 14, as described in further detail hereinabove.

In one example, the camera controller 14 stops the streaming after a predefined number of seconds after the detected 23 arrival into the positional relation, upon a subsequent detection of an end of the event (say a crossing of the ball into an area within a soccer gate, or a few seconds after that crossing, etc), say by the positional relation detector 13, as described in further detail hereinbelow.

Optionally, at least a few of the images captured with the first pixels to time ratio and at least a few of the images captured with the higher pixels to time ratio, are combined, say by the image combiner of apparatus 10, for creating an effect of zooming into a part of the constrained environment covered by a field of view of the selected camera(s).

The improved accuracy resultant upon the higher pixels to time ratio, may thus allow a broadcaster, to provide spectators of a sport event, say on a TV channel or a web site, with a close up video which creates an effect of zooming into the part of the constrained environment covered by the field of view of the selected camera(s).

Consequently, there may be clearly shown the event of interest, say an out event, captured with the higher pixels to time ratio, in the close up video. The video may thus potentially remove doubts as to proper officiating (say as to a decision made by an official such as a line judge during a football match or a tennis match).

Throughout the sport event, there is tracked 22 the motion of objects in the constrained environment, say by the motion tracker 12.

Optionally, the tracking 22 of the motion of objects (say the first object) is based on a derivation of a position of the objects in a three-dimensional space representing the constrained environment from both the images captured with the first pixels to time ratio and the images captured with the higher pixels to time ratio.

In one example, during the streaming 24 of the images captured with the higher pixels to time ratio, the derivation of the position of the first object using the images captured with the higher pixels to time ratio and the tracking 22 (say by the motion tracker 12), are based on a stereoscopic analysis of images captured with the higher pixels to time ratio. The images are captured with the higher pixels to time ratio, by two selected cameras positioned at opposite sides of the part of the constrained environment, which part is covered by a field of view of the selected cameras.

In the one example, when the images received 21 (say by the image receiver 11) are of a low pixels to time ratio, say a low resolution or a low frequency of capturing, the derivation of the position of the first object, and the tracking 22 (say by the motion tracker 12), are rather based on the received 21 images captured with the first pixels to time ratio, as described in further detail hereinabove.

Alternatively, the tracking of the motion of objects (say the first object) is based on a derivation of the position of the first object from the images captured only with the first pixels to time ratio.

In one example, the streamed images are captured with the higher pixels to time ratio, by a single camera which covers the part of the constrained environment approached by the first object, and the streamed images captured with the higher pixels to time ratio, are used for generating the close up video, but not for the derivation of the position of the first object, and not for the tracking 22 of the motion.

In one example, the received 21 images are images captured during a sport event, by two or more low frequency (LF) cameras, i.e. cameras of a low image capture frequency (say of 25 Hz), positioned around the constrained environment, say by four LF cameras positioned roughly over the four corners of a tennis court or a soccer field, as described in further detail hereinabove.

The LF cameras capture the images received 21 in real time, as described in further detail hereinabove, and as illustrated using FIG. 3A and FIG. 3B.

In the example, there are further employed several high frequency (HF) cameras, i.e. cameras of a high image capture frequency (say of 2,000 Hz), positioned at different parts of the constrained environment. Each the HF cameras has a different field of view, which covers a respective, different part of the constrained environment, say an area around a net, a specific segment of a borderline of a football field or a soccer field, etc., as described in further detail hereinbelow.

Upon the detection 23 of the first object's arrival into the positional relation, images captured by the HF cameras in high frequency, are streamed 24 in real time (or near real time), say to the apparatus 10, as described in further detail hereinabove, and as illustrated using FIG. 3A and FIG. 3B.

Thus, with the exemplary embodiment, on the one hand, interesting events (such as an out event) are captured and streamed 24 with the higher pixels to time ratio, say in the higher frequency and/or resolution—which provides for greater accuracy.

Indeed, with an availability of a greater number of images per minute (i.e. with a higher image capture frequency), the exact moment in which an event (say a landing of a ball) occurs, is more likely to be captured.

Further, the tracking 22 of the first object's (say the ball's) motion, say using the three dimensional (3D) space, may involve a calculation aimed at deriving the path taken by the first object during the time period in between each pair of consecutive images of the first object as captured, thus "bridging" between the images, for deriving the trajectory of the first object.

With the higher image capture frequency, an average path taken by the first object in the time periods between two consecutive images of the first object is shorter than with the first image capture frequency, since with the higher image capture frequency, the time period in between each pair of consecutive images is by definition, shorter than with the first, lower image capture frequency.

Consequently, the calculation aimed at deriving the paths are likely to be simpler, and computationally lighter.

Further, with an availability of a greater number of pixels per image (i.e. with a higher image capture resolution), an exact position of the objects (say the ball), is more likely to be determined, since each pixel represents a smaller area of the constrained environment.

However, the higher accuracy involves the processing of a greater number of pixels per time, and may thus be heavier in terms of bandwidth consumption, data storage, etc.

On the other hand, the images of the remaining parts of the sport event are captured and received with the lower pixels to time ratio—which is less accurate, but lighter in terms of bandwidth consumption, data storage, etc.

Consequently, there may be provided a potentially optimal usage of cameras of different pixels to time ratios (say different image capture frequencies different image capture resolutions, or both), say during a live broadcast of the sport event on a TV channel or over the internet.

Figure 3A:
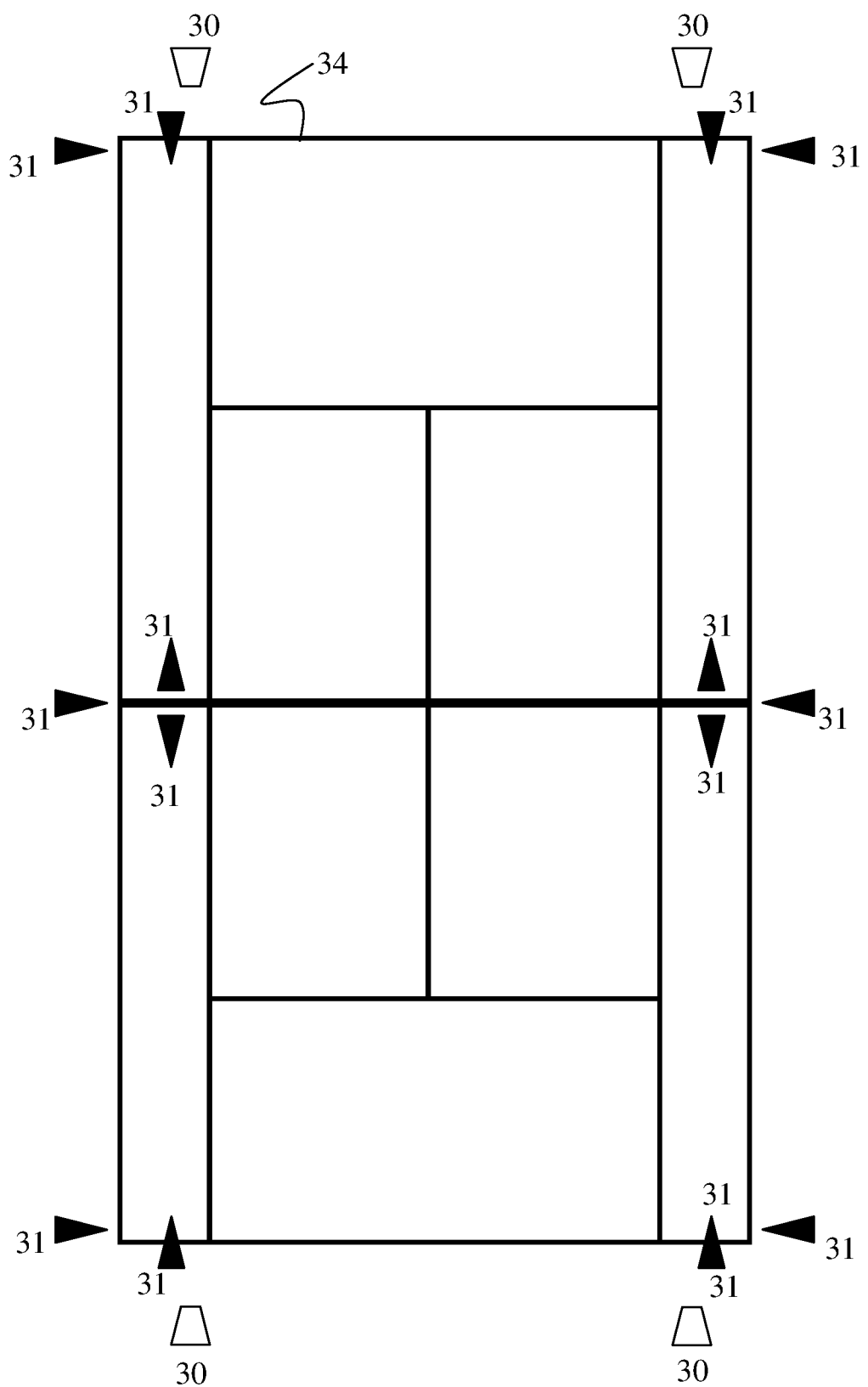
FIG. 3A is a block diagram schematically illustrating a first exemplary scenario of controlling cameras in a sport event, according to an exemplary embodiment of the present invention.

Reference is now made to FIG. 3A which is a block diagram schematically illustrating a first exemplary scenario of controlling cameras in a sport event, according to an exemplary embodiment of the present invention.

In one exemplary scenario, the apparatus 10 further includes four low frequency (LF) cameras 30, i.e. cameras of a relatively low image capture frequency (say of 25 Hz), positioned roughly over the four corners of a tennis court 34. Each the LF cameras 30 faces the court's 34 opposite half, with a tilt angle which is slightly lower than horizontal, such that the camera's field of view extends into the court's 34 half at the other side of the court 34, as described in further detail hereinbelow.

The image receiver 11 receives 21 the images captured in the relatively low frequency, as described in further detail hereinabove.

In the example, during a tennis match, the motion tracker 12 tracks 22 the motions of the first object (say a ball) through an analysis of the images captured by the LF cameras 30, in an image capture frequency of 25 Hz, i.e. with an accuracy of 40 milliseconds.

In the example, the apparatus 10 further includes several high frequency (HF) cameras 31, i.e. cameras of a higher image capture frequency (say of 2,000 Hz), positioned at different parts of the tennis court 34. Each the HF cameras 31 has a different field of view, which covers a respective, different part of the tennis court 34, say an area around a net, a specific segment of a borderline of the tennis court, etc., as described in further detail hereinbelow.

When the ball arrives at a predefined positional relation to a second object (say a borderline), say into a distance of less than two meters from a segment of the borderline, the arrival is detected 23 by the position relation tracker 13. Consequently, the camera controller 14 automatically selects among the HF cameras 31, a camera which best covers the borderline segment approached by the ball (as evident from the ball's trajectory). Then, the camera controller 14 automatically initiates 24 a streaming of images captured in a 2,000 Hz capture frequency—i.e. with an accuracy of half a millisecond, from the selected camera.

Consequently, there is enabled, a capturing of the image of the ball's landing at a point within the court's 34 borderlines or out of the court's 34 borderlines, next to the borderline segment, at the exact half a millisecond of the ball's landing.

As a result, the ball's landing is more clearly determinable as an "out" or an "in" landing, than when having to rely on the LF camera's 30 image capture frequency of 25 Hz—i.e. with an accuracy of 40 milliseconds only.

Further, a close up video of the landing which clearly shows that "in" or "out" landing of the ball, may be automatically generated and broadcasted, as described in further detail hereinabove.

Thus, with the exemplary embodiment, interesting events such as an out event are streamed in the higher frequency—which provides for greater accuracy, but involves the processing of a greater number of images per minute, and is thus likely to be heavier in terms of bandwidth consumption, data storage, etc.

However, the images of the remaining parts of the sport event are captured and received in the lower frequency—which is less accurate, but lighter in terms of bandwidth consumption, data storage, etc.

Consequently, there may be provided a potentially optimal usage of the cameras of different image capture frequencies, as described in further detail hereinabove.

Figure 3B:
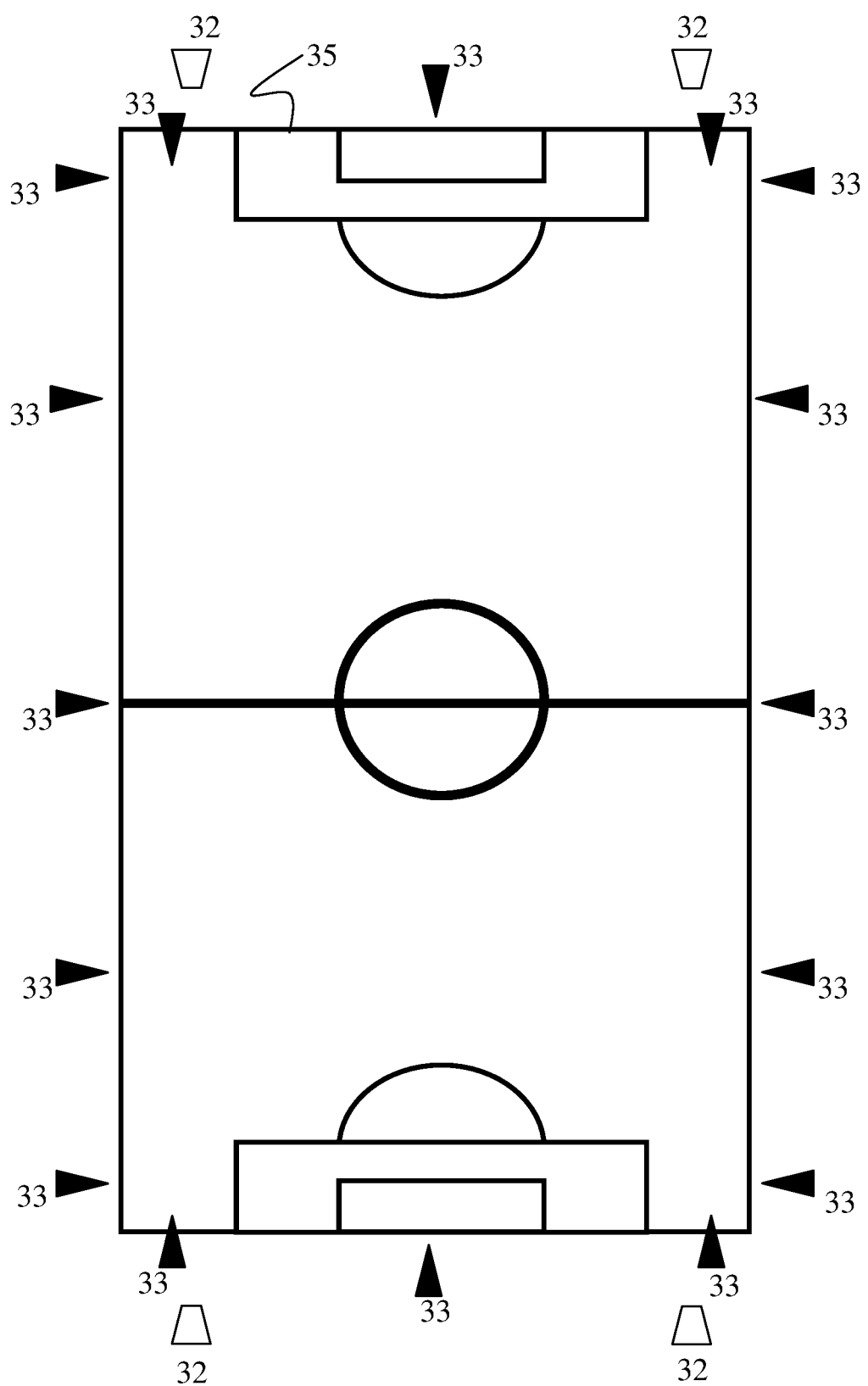
FIG. 3B is a block diagram schematically illustrating a second exemplary scenario of controlling cameras in a sport event, according to an exemplary embodiment of the present invention.

Reference is now made to FIG. 3B which is a block diagram schematically illustrating a second exemplary scenario of controlling cameras in a sport event, according to an exemplary embodiment of the present invention.

In a second exemplary scenario, the apparatus 10 further includes four low resolution (LR) cameras 32, i.e. cameras of a relatively low image capture resolution (say of a 2048×1080 resolution), positioned roughly over the four corners of a soccer field 35. Each the LR cameras 32 faces the field's 35 opposite half, with a tilt angle which is slightly lower than horizontal, such that the camera's field of view extends into the field's 35 half at the other side of the field 35.

The image receiver 11 receives 21 the images captured in the relatively low resolution, as described in further detail hereinabove.

In the example, during a game of soccer, the motion tracker 12 tracks 22 the motions of the first object (say a first player when running with a ball), in real time (or near real time) through an analysis of the images captured by the LR cameras 32, in the 2048×1080 resolution.

In the example, the apparatus 10 further includes several high resolution (HR) cameras 33, i.e. cameras of a higher image capture resolution (say of a 15360×8640 resolution), positioned at different parts of the soccer field 35. Each the HR cameras 33 has a different field of view, which covers a respective, different part of the field 35, say an area around one of the gates, a borderline segment, etc.

A second player (i.e. a second object) approaches the first player (with an intention to kick the first player), say into a distance of less than one meter from the first player, thus putting the first player in a predefined positional relation to the second player—namely, into a distance of less than one meter from the second player.

Consequently, the arrival of the first player into the predefined positional relation is detected 23 by the position relation tracker 13.

Upon the detection 23, the camera controller 14 automatically selects among the HR cameras 33, a camera which best covers the area around the two players. Then, the camera controller 14 automatically initiates 24 a streaming of images captured in the higher resolution (i.e. in the 15360×8640 resolution)—, from the selected camera.

Consequently, there is enabled, a capturing of the image of the second player when apparently, kicking the first player, at the 15360×8640 resolution which is significantly higher than the 2048×1080 resolution of the LR cameras 32, which higher resolution shows the event in finer detail.

As a result, the apparent kicking may be more clearly determinable as a "Foul", than when having to rely on the LR camera's 32 image of the lower resolution.

Further, a close up video of the kicking, which clearly shows the "Foul", may be automatically generated and broadcasted, as described in further detail hereinabove.

Consequently, there may be provided a potentially optimal usage of the cameras of different image capture frequencies, as described in further detail hereinabove.

Figure 4:
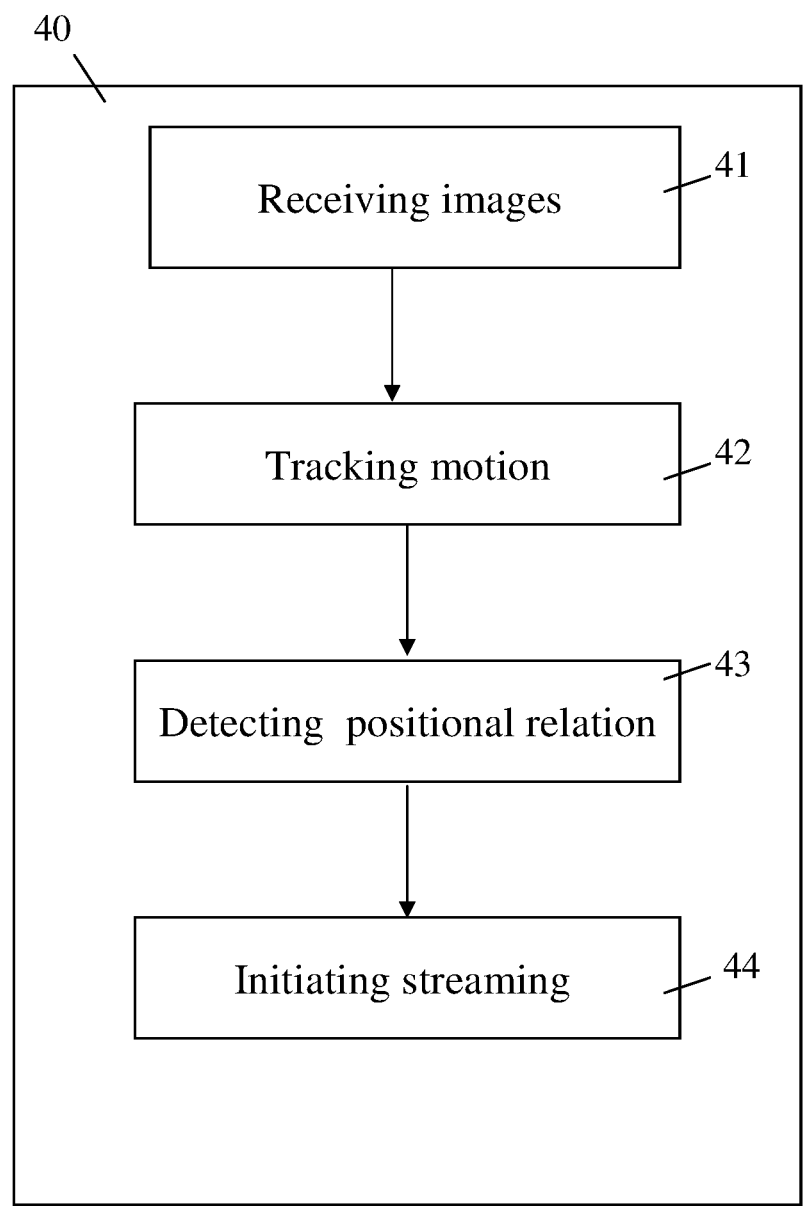
FIG. 4 is a block diagram schematically illustrating an exemplary computer readable medium storing computer executable instructions for performing steps of controlling cameras in a sport event, according to an exemplary embodiment of the present invention.

Reference is now made to FIG. 4, which is a block diagram schematically illustrating an exemplary computer readable medium storing computer executable instructions for performing steps of controlling cameras in a sport event, according to an exemplary embodiment of the present invention.

According to an exemplary embodiment of the present invention, there is provided a non-transitory computer readable medium 40, such as a CD-ROM, a USB-Memory, a Portable Hard Disk, etc.

The computer readable medium 40 stores computer executable instructions, for performing steps of controlling cameras in a sport event. The instructions may be executed upon one or more computer processors.

The computer executable instructions include a step of receiving 41 images of a sport event taking place in a constrained environment (say a football field, a soccer field, a tennis court, etc.), during the sport event, as described in further detail hereinabove.

The received 41 images are captured with a first pixels to time ratio, say in a first image capture frequency and resolution, say by one or more cameras positioned around the constrained environment, as described in further detail hereinabove.

The computer executable instructions further include a step of tracking 42 a motion of a first object (say a ball or a player), using the received 41 images which are captured with the first pixels to time ratio, during the receiving 41, as the sport event progresses (i.e. in real time), as described in further detail hereinabove.

Optionally, the motion is tracked 42 through a stereoscopic or other analysis of the images captured with the first pixels to time ratio, which analysis yields a three dimensional (3D) space which represents the constrained environment, as known in the art.

The computer executable instructions further include a step of detecting 43 an arrival of the first object (say the ball) into a predefined positional relation to a second object (say a tennis net, a soccer gate, etc.), during the tracked 42 motion, as described in further detail hereinabove.

Optionally, the detection 43 is based at least on a predefined change in shape of one of the objects (say a squeezing of the ball when the ball hits a racket or a wall, a change in shape of a net, etc.).

Optionally, the detection 43 is based at least on a distance between the objects.

In one example, there is detected 43 an arrival of a ball at a distance of below a predefined threshold from a net positioned in the middle of a constrained environment such as a tennis court, or from a borderline, during a tracked 42 motion of the ball, away from a player who strikes the ball with a racket.

In another example, the there is detected 43 an arrival of a ball at a distance of above a predefined threshold from a player, during a tracked 42 motion of the ball, away from a player who kicks the ball.

In yet another example, there is detected 43 an arrival of a player at a distance of below a predefined threshold from a football gate, during the player's motion, as tracked 42.

The computer executable instructions further include a step of, upon the detection 43 of the arrival into the positional relation, automatically initiating 44 a streaming of images captured with a pixels to time ratio higher than the first pixels to time ratio by one or more selected camera(s), as described in further detail hereinabove.

Optionally, the computer executable instructions further include a step of selecting the one or more camera(s) among a set which consists of two or more cameras, as described in further detail hereinabove.

Optionally, the selection is based on a rule predefined by an operator, an administrator, a developer (say programmer) of the instructions stored on the computer readable medium 40, etc.

Optionally, the one or more camera(s) are selected based on a trajectory of the tracked 42 motion of the first object and on the field of view of the selected camera(s), as described in further detail hereinabove.

Each of the cameras in the set has a different field of view, which may cover a respective, different part of the constrained environment, say an area around a net deployed on a volleyball court, a specific segment of a borderline of a tennis court, an areas around a soccer gate, etc.

Optionally, the selected cameras include two or more cameras deployed at different sides of a same part of the constrained environment (say on the two ends of the net, or of a borderline segment), with a different (say opposite) field of view on the same part, as described in further detail hereinbelow.

Optionally, the computer executable instructions further include a step of initiating a change in a field of view of the selected camera(s), say by triggering an actuator, as described in further detail hereinabove.

Consequently, the actuator moves the selected camera, in a rotational motion or in a motion which involves a change of tilt, so as to capture a part of the constrained environment, approached by the first object.

In one example, the selected camera is a camera also used to capture at least some of the received 41 images captured with the first pixels to time ratio, and the computer executable instructions further include a step of changing the selected camera's pixels to time ratio. For example, the computer executable instructions may include a step of changing the selected camera's image capture frequency, resolution, or both the frequency and the resolution, to a higher value, upon the detected 43 arrival. That is to say that in the example, the same camera is used to capture images with both pixels to time ratios.

Optionally and subsequently, the computer executable instructions further include a step of stopping the streaming of the images captured in the pixels to time ratio higher than the first pixels to time ratio, from the selected cameras.

Optionally, the streaming is stopped according to a predefined rule, as described in further detail hereinbelow.

In one example, the streaming is stopped after a predefined number of seconds after the detected 43 arrival into the positional relation, upon a subsequent detection of an end of the event (say a crossing of the ball into an area within a soccer gate or a few seconds after that crossing), etc., as described in further detail hereinabove.

Optionally, the computer executable instructions further include a step of combining at least a few of the images captured with the first pixels to time ratio and at least a few of the images captured with the higher pixels to time ratio, for creating a zooming effect into a part of the constrained environment covered by a field of view of the selected camera(s).

The improved accuracy resultant upon the higher pixels to time ratio, may thus allow a broadcaster, to provide spectators of a sport event, say on a TV channel or a web site, with a close up video which creates an effect of zooming into the part of the constrained environment covered by the field of view of the selected camera(s), as described in further detail hereinabove.

Consequently, there may be clearly shown the event of interest, say an out event, captured in the higher pixels to time ratio, in the close up video. The video may thus potentially remove doubts as to proper officiating (say as to a decision made by an official such as a line judge during a football match or a tennis match).

With the executed instructions, throughout the sport event, there is tracked 42 the motion of objects in the constrained environment.

Optionally, the tracking 42 of the motion of objects (say the first object) is based on a derivation of a position of the objects in a three-dimensional space representing the constrained environment, from both the images captured with the first pixels to time ratio and the images captured with the higher pixels to time ratio.

For example, the derivation of the position of the first object using the images captured in the higher pixels to time ratio, may be based on a stereoscopic analysis of images captured with the higher pixels to time ratio, by the selected cameras, say by two cameras positioned at opposite sides of the part of the constrained environment covered by a field of view of the selected cameras.

Alternatively, the tracking 42 of the motion of objects (say the first object) is based on a derivation of the position of the first object in a three-dimensional space which represents the constrained environment, from the images captured only with the first pixels to time ratio.

In one example, the streamed images are captured with the higher pixels to time ratio, by a single camera which covers the part of the constrained environment approached by the first object, and the streamed 44 images captured with the higher pixels to time ratio are used for generating a close up video. However, in the example, the streamed 44 images, captured with the higher pixels to time ratio, are not used for the derivation of the position of the first object, and not for the tracking 42 of the motion, as described in further detail hereinabove.

Further Discussion

An exemplary method for enabling analysis of events, comprises the following steps: receiving a stream of multimedia data of a real sport game in real time (RT) from a camera in a low frequency mode, analyzing the stream of multimedia data to identify an action which signifies a beginning of event by comparison to predefined templates, and tracking a motion of a first object by the camera in the low frequency mode.

The exemplary method further includes subsequent steps of predicting an event that may affect a score in the real sport game, identifying a high frequency camera having the best field of view to the second object that the first object is approaching to, activating the identified high frequency camera to transmit a stream of multimedia data, and determining an end of high frequency camera activation, according to predefined rules.

Figure 5:
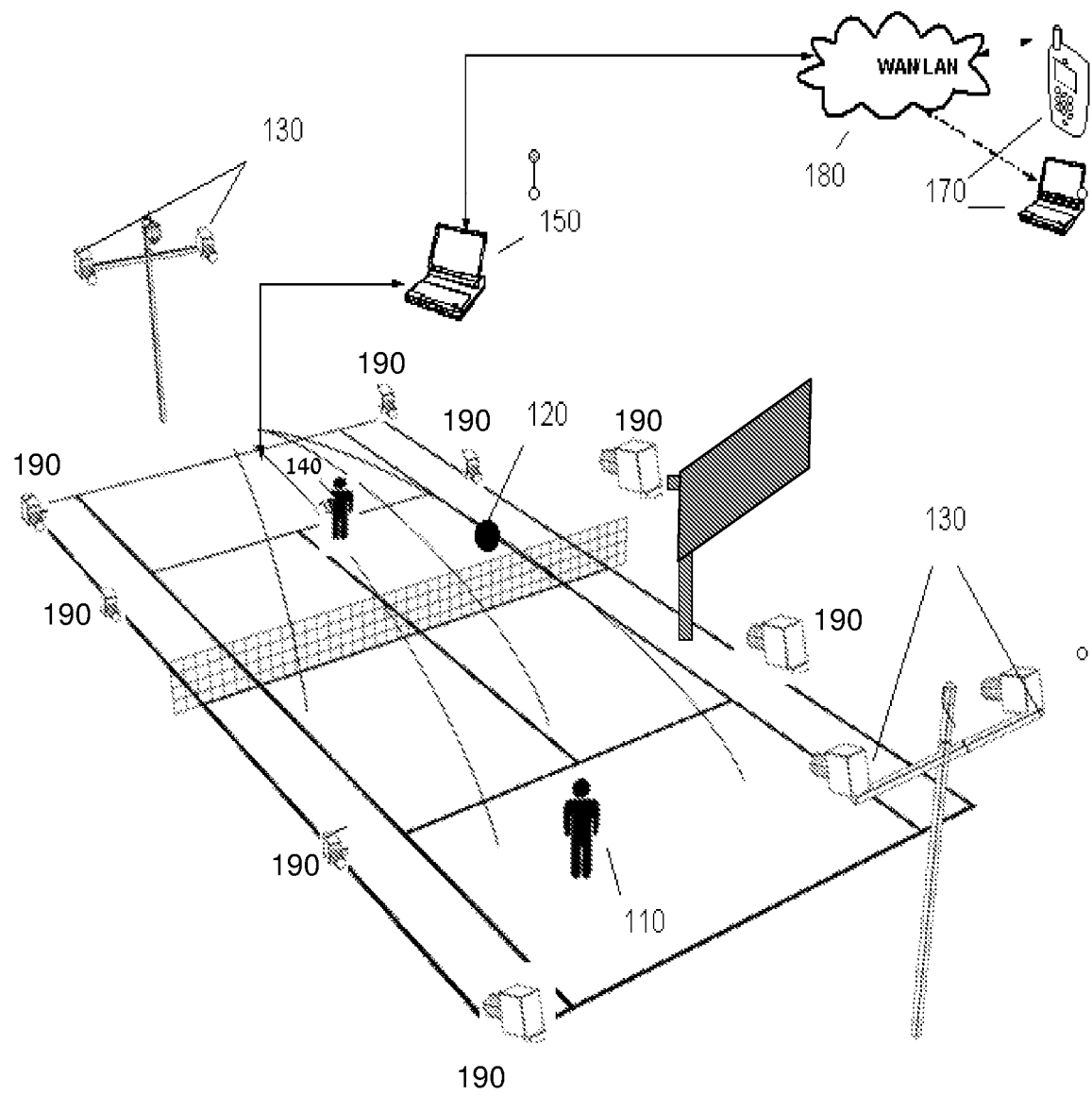
FIG. 5 is a top 3D perspective diagram of a system incorporated in a real sport environment, according to an exemplary embodiment of the present invention.

Reference is now made to FIG. 5, which is a top 3D perspective diagram of a system incorporated in a real sport environment, according to an exemplary embodiment of the present invention.

Embodiments of the present invention provide a smart-court system for identifying a location of an object (say a falling ball) in a real sport game, in real time (RT) or in near real time.

In a non-limiting example, the system illustrated in FIG. 5, may be incorporated in a tennis court, in which a real player 110 may be training or competing against a real player 140 with a tennis ball 120, say in a tennis match.

The system may include one or more computers 150, on which one or more modules are implemented as software, hardware, or a combination of software and hardware, as described in further detail hereinbelow.

The one or more computers 150 may also include additional modules, say for broadcasting the sport event to a remote audience, say on TV channels, or over a wide area network 180 such as the internet, to computers and smart phones 170, in use by members of the remote audience.

The system may identify in RT or near RT, during the real sport game, the location of an object. In one example, there may be calculated the exact contact area that the ball makes with the court during a bounce action.

According to one aspect of the present invention, relatively low frequency cameras 130 may be utilized to monitor a 3D area within and around the game's court, for capturing and tracking motion of the real tennis players 110 and 140 and the ball 120.

According to some embodiments of the present invention, there is provided a data processing system that is connected to multiple low frequency cameras 130 and multiple high frequency cameras 190.

In a non limiting example, the low frequency cameras 130 have a 50 Hz frequency, and the high frequency cameras 190 have a 1000 Hz frequency (the frequency representing the image capture rate).

Using only the high frequency cameras 190 for capturing large portions of the games, results in large data files which require big data storage equipment and strong processing units.

The data processing system may be arranged to receive a stream of multimedia data of a RT or near RT sport session from the multiple low frequency cameras 130—in a non limiting example, from four low frequency cameras 130, and to determine when an event is about to occur.

The high frequency cameras 190 capture images along the lines of the court, with a horizontal, narrow viewing angle.

Alternatively, according to some embodiments, instead of a plurality of high frequency cameras 190 and a plurality of low frequency cameras 130, as described hereinabove, there may be used a plurality of cameras which operate on a low frequency mode and when receiving a certain signal, switch to a higher frequency mode.

This type of cameras, that operate on a low frequency mode and on a high frequency mode, according to demand, may have a wider angle of photo and the direction of their transmission of multimedia file to the system may be controlled.

According to some embodiments of the present invention, when the data processing system identifies that an event such an out event, is about to occur, using the low frequency cameras 130, the data processing system selects a high frequency camera out of the multiple high frequency cameras 190, and activates the high frequency camera.

Alternatively, the data processing system may send a signal to a camera that operates in low frequency to change mode to high frequency mode and determine a shooting angle.

The activated high frequency camera 190 may forward multimedia data to the data processing system, for analysis of the event.

The number of cameras may be related to the range of covering of photo of each camera. In a non limiting example, the number of high frequency cameras 190 may be fourteen, as illustrated using FIG. 3A, hereinabove.

Optionally, in order to identify an event during the real sport game, the system may perform an analysis by receiving a stream of a multimedia data of the real sport game in RT, from the low frequency cameras 130. The analysis may be for identifying when an event is about to occur and determine which one of the high frequency cameras 190 should be activated, for capturing the event.

After an event is identified, the system may stop the activation of the high frequency camera. The forwarding of the multimedia data from the camera to the system may be stopped: (i) arbitrarily, after a predefined period; or (ii) after a predefined amount of time after identification that a ball 120 touches an object.

An event that the system may identify may be related to an object in the real sport game.

In a non limiting example, an event may span the exact contact points which the ball 120 makes with a tennis court during bouncing, which contact points may be used for determining if the ball 120 touches the line or not.

In another non limiting example, an event may be when a ball 120 hits or touches the net or alternatively when the ball 120 fails to hit or touch the net.

In yet another non limiting example, an event may be when a ball 120 hits a racket.

In yet another non limiting example, in case the ball 120 doesn't touch the line when the ball 120 bounces, the system may calculate the distance between the point where the ball 120 hits the ground and the line.

Figure 6:
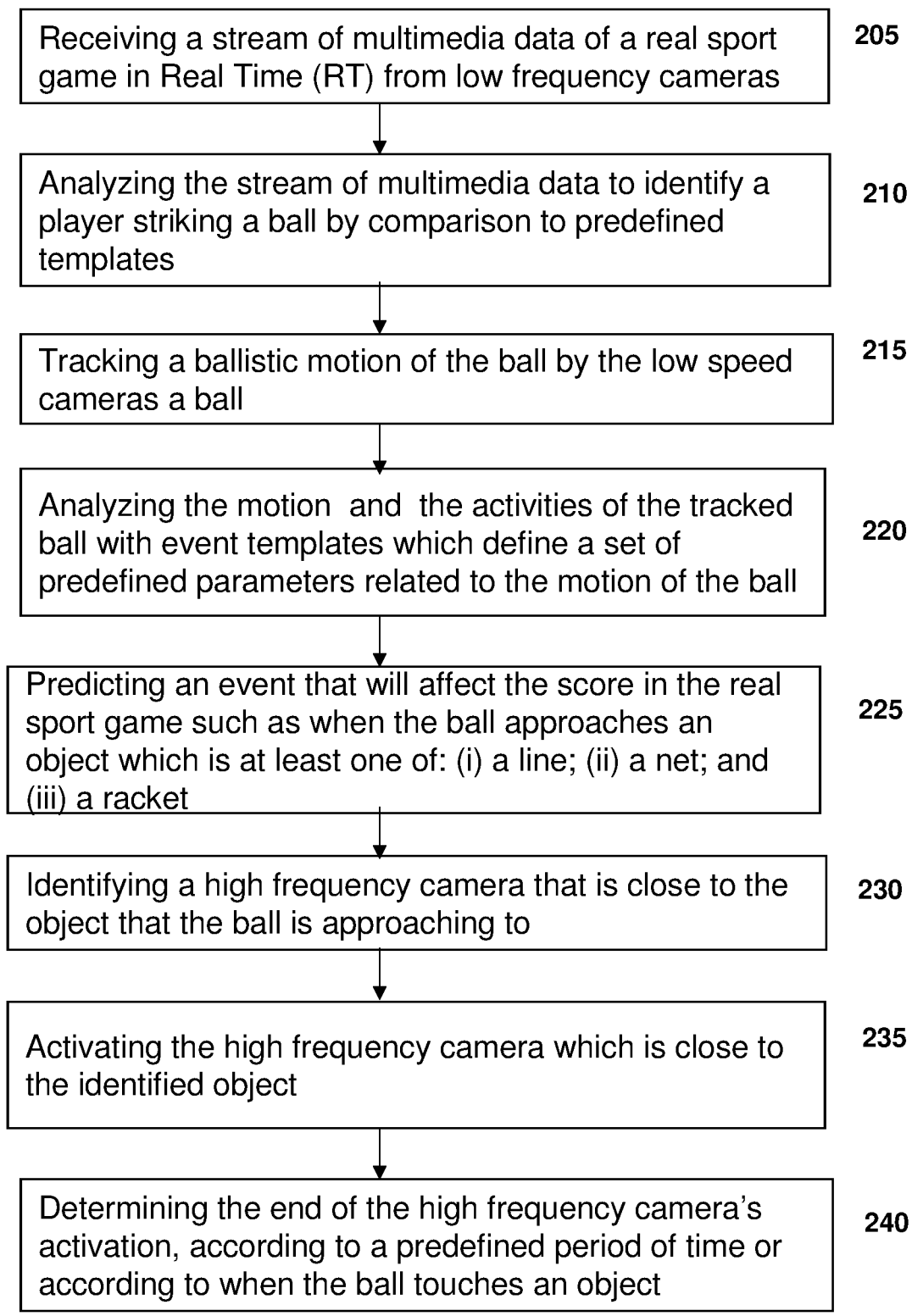
FIG. 6 is a flowchart illustrating activity of an event prediction module, according to an exemplary embodiment of the present invention.

Reference is now made to FIG. 6, which is a flowchart illustrating activity of an event prediction module, according to an exemplary embodiment of the present invention.

According to another aspect of the present invention, an event prediction module of the exemplary data processing system, may receive a stream of multimedia data of a real sport game in Real Time (RT) from the low frequency cameras 130 illustrated in FIG. 5 (stage 205).

The received stream of multimedia data may be analyzed by the event prediction module, to identify a ball's 120 strike by comparison to predefined templates (stage 210). After the strike is identified, a ballistic motion of the ball 120 may be tracked by the low frequency cameras 130 (stage 215).

According to another aspect of the present invention, the event prediction module may analyze the motion and the activities of the tracked ball 120 with event templates which define a set of predefined parameters related to motion of the ball 120 (stage 220).

Based on the analysis of the motion of the ball 120, the predicted trajectory of the ball 120 may be calculated, in order to predict an event with a potential to affect the score of the real sport game, such as the ball's 120 approaching to an object which is at least one of: (i) a line; (ii) a net; and (iii) a racket (stage 225), and to identify a high frequency camera 190 that is closest to an object approached by the ball (stage 230).

Then, there is selected and activated the identified high frequency camera 190 which is closest to the object approached by the ball 120 (stage 235).

The end of the high frequency camera's activation may be determined according to predefined rules such as a predefined period of time or according to identification of the ball's 120 touching an object by the event prediction module (stage 240). Thus, the end of selected high frequency camera's activation may be arbitrary, after a predefined amount of time, or alternatively, after a predefined of time after the end of event.

Figure 7:
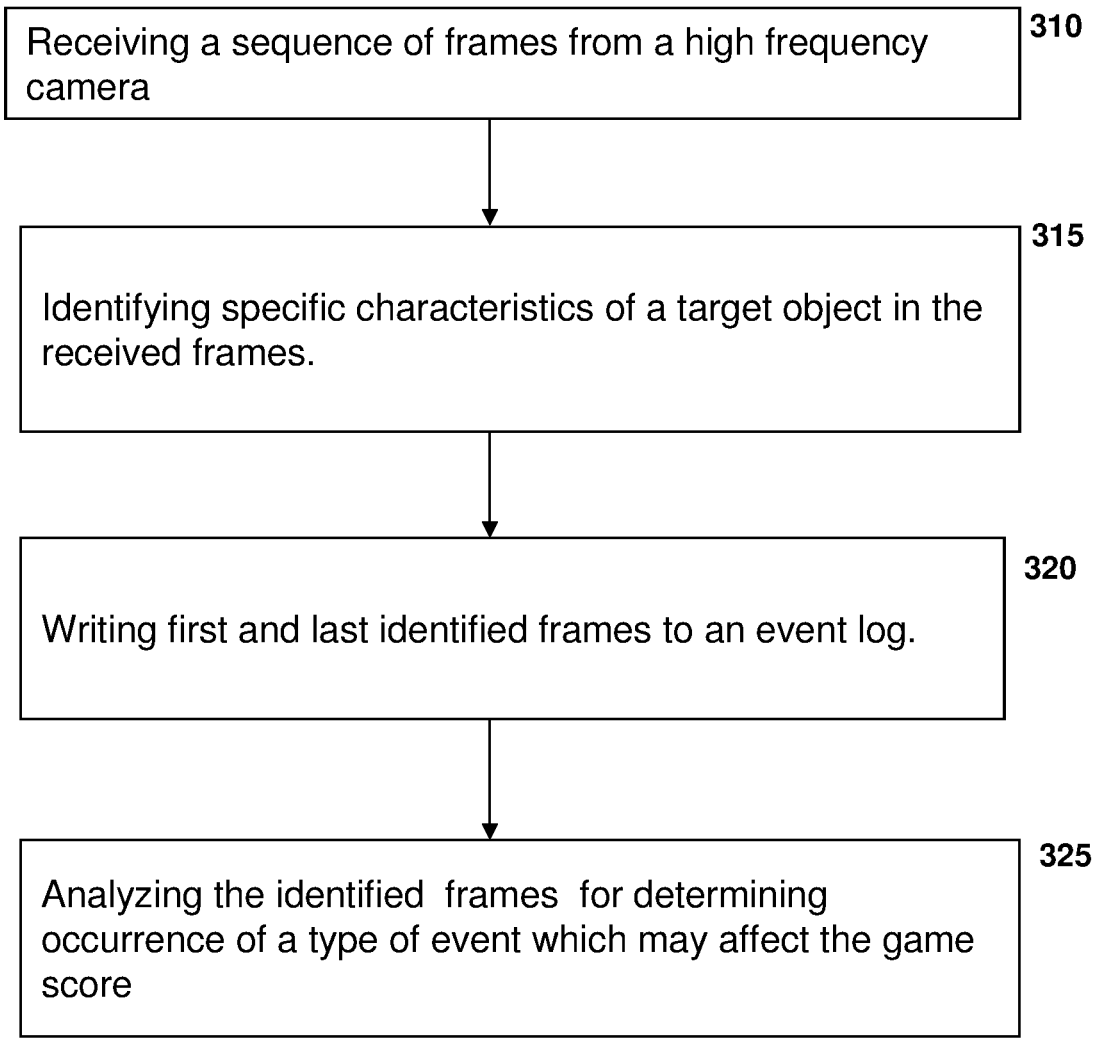
FIG. 7 is a flowchart illustrating activity of high frequency frame analysis module, according to an exemplary embodiment of the present invention.

Reference is now made to FIG. 7, which is a flowchart illustrating activity of high frequency frame analysis module, according to an exemplary embodiment of the present invention.

According to another aspect of the present invention, a high frequency frame analysis module of the exemplary data processing system, may receive a sequence of frames (i.e. images) from a high frequency camera (stage 310).

In the sequence of frames, the high frequency frame analysis module may search for specific characteristics of a target object in the received frames (stage 315).

For example, if the target object is a ball 120, the characteristic that is searched for, may be a change in the ball's 120 shape (i.e. that the ball 120 is squeezed), when the ball 120 touches the ground. Alternatively, the shadow of the ball 120 may be tracked and analyzed to identify if the ball 120 touches the ground.

In another example, the target object is a net, and when the ball 120 touches the net, the movement of the net is identified.

When the part of the sequence of frames, which involves the event (i.e. the characteristic is searched for), is identified, the high frequency frame analysis module may write the first and the last frames of that part, to an event log.

Optionally, the part of the sequence of frames which involves the event first and last frames is extended to include the frames where the characteristics of the target object are identified plus a predefined amount of frames before and a predefined amount of frames after the frames which involve the event (stage 320).

The frames in the part of the sequence are analyzed for determining occurrence of a type of event which may affect the score in the real sport game (stage 325). For example, an event which may affect the score, may be determined to occur when the ball 120 touches the ground within the game boundaries (called 'IN'), or when the ball 120 touches the boundaries' line or when the ball 120 falls outside the boundaries (called 'OUT').

Figure 8:
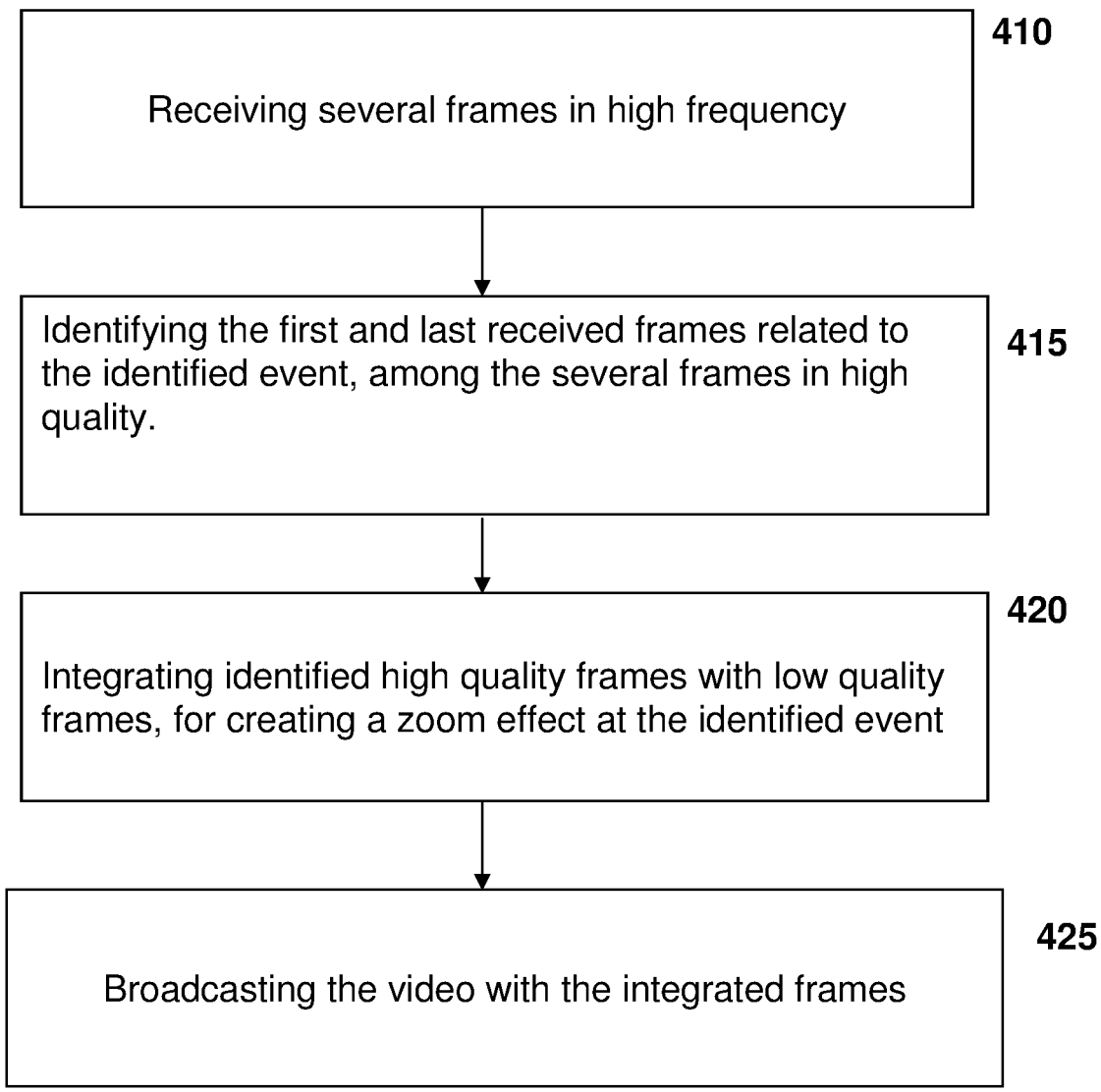
FIG. 8 is a flowchart illustrating activity of embedding frames in a multimedia stream module, according to an exemplary embodiment of the present invention.

Reference is now made to FIG. 8, which is a flowchart illustrating activity of embedding frames in a multimedia stream module, according to an exemplary embodiment of the present invention.

According to another aspect of the present invention, a module of the exemplary data processing system, for embedding frames in a multimedia stream, may receive several frames in the high frequency from the high frequency frame analysis module, as described in further detail hereinabove (stage 410).

According to another aspect of the present invention, the first and last received frames which relate to the identified event from the several frames in high frequency, may be identified (stage 415).

According to another aspect of the present invention, the identified high frequency frames are integrated with the low frequency frames for creating a video showing a zoom effect at the identified event (stage 420).

According to another aspect of the present invention, after the frames in the high frequency are integrated with the low frequency frames, thus embedding the high frequency frames in the video showing the zoom effect, which is made primarily of the low frequency frames, the video may be broadcast online (stage 425).

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

It is expected that during the life of this patent many relevant devices and systems will be developed and the scope of the terms herein, particularly of the terms "Computer", "Processor" "Camera", "Network", "Video", "TV Channel", "Website", "USB-Memory", "Portable Hard Disk" and "CD-ROM", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for controlling cameras in a sport event, the method comprising steps executed by at least one computer, the steps comprising:
    during a sport event taking place in an environment, receiving images of the sport event, the images being captured by a fixed set of at least two cameras with a first pixels to time ratio;
    tracking a motion of a first object in three dimensions, using the images captured by the fixed set of cameras with the first pixels to time ratio;
    detecting an arrival of the first object into a predefined positional relation to a second object, during the tracked motion of the first object in three dimensions; and
    upon the detected arrival, initiating a streaming of images being captured with a pixels to time ratio higher than the first pixels to time ratio by at least one selected camera and a tracking of the motion of the first object in three dimensions, using the images captured with the pixels to time ratio higher than the first pixels to time ratio, the motion of the first object being tracked in three dimensions even before the detected arrival.

2. The method of claim 1, wherein the higher pixels to time ratio is resultant upon a higher resolution of image capturing.

3. The method of claim 1, wherein the higher pixels to time ratio is resultant upon a higher frequency of image capture by the at least one selected camera.

4. The method of claim 1, further comprising deriving a position of the first object in a three-dimensional space representing the environment from the images captured only with the first pixels to time ratio, for said tracking.

5. The method of claim 1, further comprising deriving a position of the first object in a three-dimensional space representing the environment from the images captured with the first pixels to time ratio and the images being captured with the higher pixels to time ratio, for said tracking.

6. The method of claim 1, further comprising selecting the at least one camera among a plurality of cameras, based on a predefined rule.

7. The method of claim 1, further comprising selecting the at least one camera among a plurality of cameras, each of the cameras having a different field of view covering a respective part of the environment, said selecting being based on a trajectory of the tracked motion of the first object and on the field of view of the selected camera.

8. The method of claim 1, wherein the selected cameras comprise at least two cameras deployed at different sides of a same part of the environment, and having different fields of view on the same part.

9. The method of claim 1, further comprising combining at least one of the images captured with the first pixels to time ratio and at least one of the images captured with the higher pixels to time ratio, for creating an effect of zooming into a part of the environment covered by a field of view of the selected camera.

10. The method of claim 1, further comprising changing a pixels to time ratio of the selected camera to the higher pixels to time ratio, upon the detected arrival, wherein the selected camera is a camera also used to capture at least some of the images captured with the first pixels to time ratio.

11. The method of claim 1, wherein said detecting of the arrival of the first object into the predefined positional relation to the second object, is based at least on a predefined change in shape of one of the objects.

12. The method of claim 1, wherein said detecting of the arrival of the first object into the predefined positional relation to the second object, is based at least on a distance between the objects.

13. The method of claim 1, further comprising stopping the streaming of the images being captured with the pixels to time ratio higher than the first pixels to time ratio, according to a predefined rule.

14. The method of claim 1, further comprising initiating a change in field of view of the selected camera.

15. An apparatus for controlling cameras in a sport event, the apparatus comprising:
    a computer;
    an image receiver, implemented on the computer as software, as hardware, or as a combination of software and hardware, and configured to receive images of a sport event taking place in an environment, during the sport event, the images being captured by a fixed set of at least two cameras with a first pixels to time ratio;
    a motion tracker, implemented on the computer as software, as hardware, or as a combination of software and hardware, in communication with said image receiver, configured to track a motion of a first object in three dimensions, using the images captured by the fixed set of cameras with the first pixels to time ratio;
    a positional relation detector, implemented on the computer as software, as hardware, or as a combination of software and hardware, in communication with said motion tracker, configured to detect an arrival of the first object into a predefined positional relation to a second object, during the tracked motion of the first object in three dimensions; and
    a camera controller, implemented on the computer as software, as hardware, or as a combination of software and hardware, in communication with said positional relation detector, configured to initiate a streaming of images being captured with a pixels to time ratio higher than the first pixels to time ratio by at least one selected camera and a tracking of the motion of the first object in three dimensions, using the images captured with the pixels to time ratio higher than the first pixels to time ratio, upon the detected arrival, the motion of the first object being tracked by said motion tracker in three dimensions even before the detected arrival.

16. The apparatus of claim 15, further comprising a camera selector implemented on the computer as software, as hardware, or as a combination of software and hardware, in communication with said camera controller, configured to select the at least one camera among a plurality of cameras, based on a predefined rule.

17. The apparatus of claim 15, further comprising a camera selector, implemented on the computer as software, as hardware, or as a combination of software and hardware, in communication with said camera controller, configured to select the at least one camera among a plurality of cameras, based on a trajectory of the tracked motion of the first object and on the field of view of the selected camera, each of the cameras having a different field of view covering a respective part of the environment.

18. The apparatus of claim 15, wherein the selected cameras comprise at least two cameras deployed at different sides of a same part of the environment, and having different fields of view on the same part.

19. The apparatus of claim 15, further comprising an image combiner, implemented on the computer as software, as hardware, or as a combination of software and hardware, in communication with said camera controller, configured to combine at least one of the images captured with the first pixels to time ratio and at least one of the images captured with the higher pixels to time ratio, for creating an effect of zooming into a part of the environment covered by a field of view of the selected camera.

20. The apparatus of claim 15, wherein said camera controller is further configured to change a pixels to time ratio of the camera to the higher frequency, upon the detected arrival, wherein the selected camera is a camera also used to capture at least some of the images captured with the first pixels to time ratio.

21. The apparatus of claim 15, wherein said positional relation detector is further configured to base the detecting of the arrival of the first object into the predefined positional relation to the second object, at least on a predefined change in shape of one of the objects.

22. The apparatus of claim 15, wherein said positional relation detector is further configured to base the detecting of the arrival of the first object into the predefined positional relation to the second object, at least on a distance between the objects.

23. The apparatus of claim 15, wherein said camera controller is further configured to stop the streaming of the images being captured with the pixels to time ratio higher than the first pixels to time ratio, according to a predefined rule.

24. The apparatus of claim 15, wherein said camera controller is further configured to initiate a change in field of view of the camera.

25. A non-transitory computer readable medium storing computer executable instructions for performing steps of controlling cameras in a sport event, the steps comprising:
  during a sport event taking place in an environment, receiving images of the sport event, the images being captured by a fixed set of at least two cameras with a first pixels to time ratio;
  tracking a motion of a first object in three dimensions, using the images captured by the fixed set of cameras with the first pixels to time ratio;
  detecting an arrival of the first object into a predefined positional relation to a second object during the tracked motion of the first object in three dimensions; and
  upon the detected arrival, initiating a streaming of images being captured with a pixels to time ratio higher than the first pixels to time ratio by at least one selected camera and a tracking of the motion of the first object in three dimensions, using the images captured with the pixels to time ratio higher than the first pixels to time ratio, the motion of the first object being tracked in three dimensions even before the detected arrival.

* * * * *